United States Patent [19]
Holroyd et al.

[11] 3,997,641
[45] Dec. 14, 1976

[54] METHOD OF MANUFACTURING TIRE INNER TUBES

[75] Inventors: Eric Holroyd, High Legh Park, near Knutsford; Anthony Gerald Goodfellow, Maghull, near Liverpool, both of England

[73] Assignee: Dunlop Limited, London, England

[22] Filed: July 8, 1974

[21] Appl. No.: 486,619

[30] Foreign Application Priority Data

July 18, 1973  United Kingdom ............ 34119/73

[52] U.S. Cl. .................................. 264/89; 156/118; 156/292; 264/93; 264/96; 264/248; 264/294; 264/326; 425/45
[51] Int. Cl.² ..................... B29C 17/07; B29H 5/10
[58] Field of Search ................ 264/89, 93, 94, 96, 264/248, 294, 296, 297, 315, 326, 335; 425/501, 502, 503, 519, 44, 45; 156/110 R, 125, 118, 245, 292, 221, 228

[56]  References Cited
UNITED STATES PATENTS

| | | | |
|---|---|---|---|
| 1,219,351 | 3/1917 | Roberts | 156/292 X |
| 3,825,457 | 7/1974 | Holroyd et al. | 264/248 X |

*Primary Examiner*—Jan H. Silbaugh
*Attorney, Agent, or Firm*—Stevens, Davis, Miller & Mosher

[57]  ABSTRACT

A method of manufacturing tire inner tubes in which the tube is moulded in two annular parts from worked uncured rubber, and the parts are joined but before curing of the rubber is completed the tube is stretched to a larger internal diameter and inflated into a mould with the larger internal diameter.

9 Claims, 6 Drawing Figures

METHOD OF MANUFACTURING TIRE INNER TUBES

This invention relates to the manufacture of tubes, and in particular to the manufacture of inner tubes for pneumatic tires.

The conventional method of manufacturing tubes for pneumatic tires at the present time is to extrude a tube of uncured rubber, cut a length of tube from the extrusion and butt join the ends of the length of tube to form it into an annulus.

The disadvantage of this method of manufacturing tubes is that the joint lies in a radial plane and when the tube is used in a radial ply tire the joint is parallel to the carcass reinforcing cords and is placed under continued stress by the flexing of the cords adjacent to it. This can lead to failure of the tube joint.

In commonly assigned U.S. patent application 198,812, filed Nov. 15, 1971, now U.S. Pat. No. 3,825,457, July 23, 1974, and its divisional U.S. patent application Ser. No. 398,699 filed Sept. 19, 1973, now U.S. Pat. No. 3,898,121, Aug. 5, 1975 and in commonly assigned U.S. patent application Ser. No. 389,209 filed Aug. 17, 1973, now abandoned, is described a moulding method and apparatus which is able to produce tubes which have circumferentially extending joints.

We have now found that this method can be extended to produce tubes of different sizes from the same initial moulding apparatus.

According to the present invention a method for the manufacture of inner tubes for pneumatic tires comprises the following steps:

a. moulding the tube in two annular parts from uncured rubber which has been mechanically worked so as to destroy its nerve or memory, b. bringing the two parts together under pressure whilst the rubber is in the worked condition to form a tube having a circumferential joint, c. stretching the tube whilst still not completely cured to a desired internal diameter and placing it in a mould of corresponding diameter, d. inflating the tube in the mould and effecting final cure of the rubber by the application of heat.

Step (a) the moulding of the tube in two annular parts, is preferably carried out in the same way as is described in commonly assigned U.S. patent application Ser. No. 198,812, filed Nov. 15, 1971, now U.S. Pat. No. 3,825,457, July 23, 1974, and its divisional U.S. patent application Ser. No. 398,699, filed Sept. 19, 1973, now U.S. Pat. No. 3,898,121, Aug. 5, 1975. In this method the tube parts are moulded from worked, uncured rubber in heated female mould cavities each provided with a locking sprue. It will be appreciated that the rubber is warm at this stage, but is below the temperature at which rapid cure takes place. The mould is pressurized, i.e. the atmosphere surrounding the mould is pressurized with gas e.g. compressed air, before opening in order that as the mould is opened gas can flow under pressure into the opening mould and co-operate with the locking sprue to hold the moulded part in the female mould cavity, the sprue preventing gas getting behind the moulded part.

Step (b) is then preferably carried out by bringing together the two female mould cavities, carrying their respective formed parts, still heated and in a pressurized atmosphere and the tube is then removed from the mould and preferably allowed to cool down or positively cooled, to arrest cure. The locking sprues are then preferably trimmed from the tube.

At this stage the rubber of the tube has been partly cured. The cure must be even throughout the tube in order to enable the tube to stretch evenly in stage (c) and this is best achieved by careful control of the temperature of the heated female mould cavities.

Step (c) may be carried out manually on a cool tube or by a purpose built machine, and the stretched tube is placed in a mould of the desired internal diameter. It will be noted that in this step the stretching forces applied are parallel to the direction of the tube joint thus putting the minimum stress on the joint.

In step (d) the tube is inflated to the shape of the larger mould and cured in this condition so that the final tube has a larger internal diameter than the mould initially used. In this way the internal tube diameter may be increased from the initial moulded diameter by a ratio of up to 2.5 to 1 (dependent upon compound) and since the mould used for final cure need stand only the tube inflation pressure this is an inexpensive item. Thus one initial moulding apparatus which is a relatively costly item may be used in conjunction with a plurality of simple and inexpensive moulds to produce tubes in a wide range of sizes.

If desired the tube may be moulded initially with a flattened cross-sectional shape, for example as described in commonly assigned U.S. patent application Ser. No. 389,209, filed Aug. 17, 1973 now abandoned, thus enabling the initial mould to be even smaller in overall diameter.

Also, if desired the initial mould cavity used in steps (a) and (b) need not be circular in plan but could assume a convoluted or other tortuous path.

The invention will now be described in more detail, by way of example only, with reference to the accompanying drawings in which.

Figure 1:
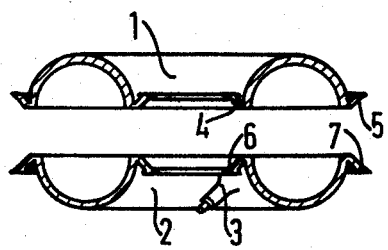
FIG. 1 illustrates a pair of tube halves moulded from worked uncured rubber.

The tube halves 1 and 2 shown in FIG. 1 were moulded from uncured worked rubber compound, e.g. a butyl rubber rubber tube compound, by the method described in commonly assigned U.S. patent application Ser. No. 198,812, filed Nov. 15, 1971, now U.S. Pat. No. 3,825,457, July 23, 1974, and its divisional U.S. patent application Ser. No. 398,699 filed Sept. 19, 1973, now U.S. Pat. No. 3,898,121, Aug. 5, 1975. The tube half 2 contains an inflation valve 3 and both halves have locking sprues 4, 5, 6 and 7. Whilst still carried in their corresponding female mould halves (not shown) the tube halves are joined by bringing the mould halves together in a pressurized atmosphere.

Figure 2:
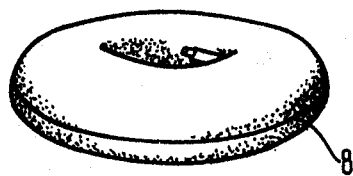
FIG. 2 illustrates the appearance of the uncured tube after joining of the halves and removal of the locking spews.

The tube thus formed is removed from the mould and allowed to cool down and the locking sprues are trimmed off from the circumferential joint 8. (see FIG. 2).

Figure 3:
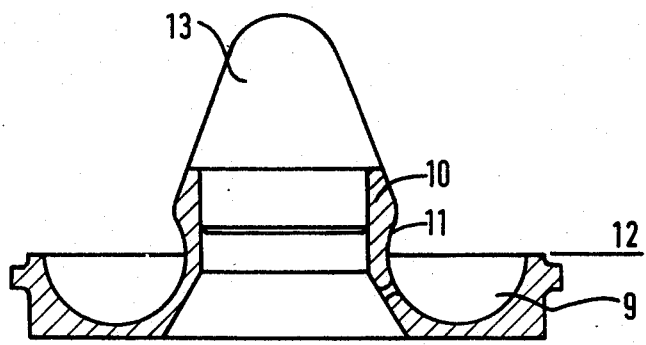
FIG. 3 illustrates the bottom half of a mould having a tapered mandrel to facilitate stretching of the uncured tube shown in FIG. 2 into the mould.

FIG. 3 illustrates the bottom half of a lightweight mould for carrying out the final curing operation. The mould half contains a female mould cavity 9 of greater internal diameter than the tube formed by joining initially moulded halves together. The mould half is provided with an axially extended centre portion 10 which carries the moulding surface 11 for the internal diameter of the tube well beyond the mid-circumferential plane 12 of the tube moulding cavity. A tapered mandrel 13 is provided to fit on the centre portion 10 to enable the incompletely cured tube to be stretched into the mould cavity, the extended centre portion 10 of the mould half carrying the surface 11 ensuring that the stretched tube remains in position when the mandrel is removed.

Figure 4:
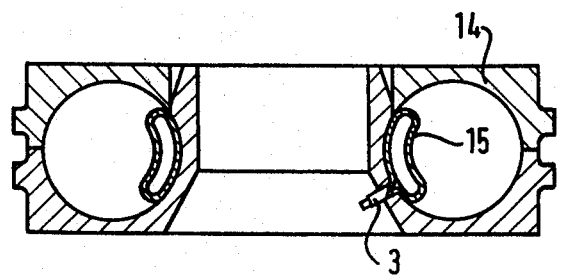
FIG. 4 is a sectional view of the tube in the mould.
Figure 5:
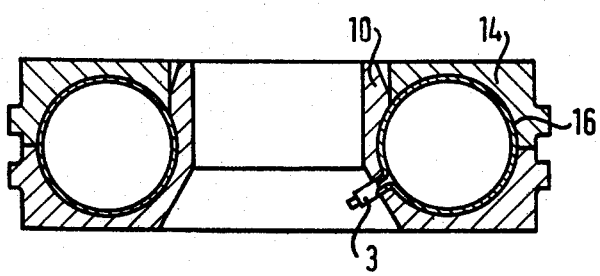
FIG. 5 is a similar view showing the tube inflated into the larger mould.

FIG. 4 illustrates the next stage in the process where the top mould half 14 is in position on the bottom mould half and the stretched incompletely cured tube 15 is inside the mould cavity thus formed. The tube is then inflated to fill the mould cavity as shown in FIG. 5 and the mould heated to cure the rubber of the inflated tube 16.

Figure 6:
FIG. 6 illustrates the final size of the cured tube.

FIG. 6 illustrates the final size of the inflated fully cured tube 17; which is determined by consideration of the initial cured condition of the tube before stretching into the larger mould and the "permanent set" characteristics of the compound. In general the final size of the cured tube is less than the size of the post-cure mould but greater than the initial mould. The cure in the tube halves at the joining stage is carefully regulated since a sufficient joint strength is needed for stretching the tube whereas on the other hand the permanent set of the tube in the final stage is maximized by minimum cure being present in the tube before the stretching step.

In laboratory tests using a butyl rubber compound to produce sample tubes by this method the tube was cooled to 20° C before hand-stretching into the larger mould, which was also at a low temperature to facilitate handling, and the tube was eventually heated to complete curing by heating the larger mould to a temperature of 150° to 160° C.

In addition to the mandrel method illustrated in FIG. 3 other systems can be employed which would assist mass production of tubes for example, an expanding ring could be employed in which mechanical fingers would stretch the internal diameter of the incompletely cured tube. At the same time gas would inflate the tube and so stretch the cross-section and outer periphery of the tube. The inflated tube would be placed automatically on to suspended sample formers or moulds and passed through a curing chamber.

A further alternative system could employ rotating rollers which would revolve and open up their spacing at the same time. This would be a machine capable of handling a wide range of sizes. Again the stretched tube would be transferred to a mould for final cure.

Another alternative would be to use an inflatable bladder to increased the internal diameter of the tube. This would assist in loading of the tube into the final mould for cure.

Having now described our invention, what we claim is:

1. A method for the manufacture of inner tubes for pneumatic tires comprising the following steps:
    a. moulding the tire in two annular parts from uncured rubber which has been mechanically worked so as to destroy its nerve or memory,
    b. bringing the two parts together under pressure whilst the rubber is in the worked condition and at a temperature below that at which rapid cure takes place to form a tube having circumferential joints,
    c. stretching the tube to a desired internal diameter whilst still not completely cured by applying forces parallel to the direction of said joints and placing the tube in a mould having a toroidal shaped cavity of corresponding internal diameter,
    d. inflating the tube in the mould to the shape of said cavity and effecting final cure of the rubber by the application of heat.

2. A method according to claim 1 in which the tube parts are moulded from worked, uncured rubber in heated female mould cavities each provided with a locking sprue, and the mould is pressurized before opening in order that as the mould is opened, gas can flow under pressure into the opening mould and cooperate with the locking sprue to hold the moulded part in the female mould cavity, the sprue preventing gas getting behind the moulded part.

3. A method according to claim 2 in which step (b) is carried out by bringing together the two female mould cavities carrying their respective moulded parts, still heated and in a pressurized atmosphere.

4. A method according to claim 3 in which the tube formed in step (b) is removed from the mould and the locking sprues trimmed off prior to the stretching step (c).

5. A method according to claim 1 in which the tube formed in step (b) is cooled down to arrest cure before the stretching step (c).

6. A method according to claim 1 in which the tube is stretched in step (d) to an internal diameter up to 2.5 times greater than its initial moulded diameter.

7. A method according to claim 1 in which the cure in the tube halves at the joining step (b) is arranged to be the minimum consistent with the joint being of sufficient strength to endure the subsequent stretching without failure.

8. A method according to claim 1 in which the tube is stretched in step (d) onto a mould part carrying the moulding surface for the internal diameter of the tube beyond the mid-circumferential plane of the tube moulding cavity.

9. A method according to claim 8 in which the tube is stretched by means of a tapering mandrel.

* * * * *